United States Patent
Bak et al.

(10) Patent No.: US 10,579,417 B2
(45) Date of Patent: Mar. 3, 2020

(54) BOOSTING USER THREAD PRIORITIES TO RESOLVE PRIORITY INVERSIONS

(71) Applicant: Microsoft Technology Licensing, LLC, Redmond, WA (US)

(72) Inventors: Yevgeniy M. Bak, Redmond, WA (US); Mehmet Iyigun, Kirkland, WA (US); Christopher Peter Kleynhans, Bellevue, WA (US); Syed A. Raza, Chicago, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 195 days.

(21) Appl. No.: 15/497,482

(22) Filed: Apr. 26, 2017

(65) Prior Publication Data

US 2018/0314547 A1    Nov. 1, 2018

(51) Int. Cl.
*G06F 9/46* (2006.01)
*G06F 9/48* (2006.01)

(52) U.S. Cl.
CPC .......... *G06F 9/4831* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 7,278,141 B2 | 10/2007 | Accapadi et al. | |
| 7,380,247 B2 | 5/2008 | Accapadi et al. | |
| 7,751,261 B2* | 7/2010 | Cho | G11C 7/22 365/194 |
| 7,752,621 B2 | 7/2010 | Kush | |
| 7,886,300 B1 | 2/2011 | Long et al. | |
| 2002/0178208 A1 | 11/2002 | Hutchison et al. | |
| 2005/0125789 A1 | 6/2005 | Dijkstra et al. | |
| 2006/0259907 A1* | 11/2006 | Bhatia | G06F 9/526 718/104 |
| 2013/0080672 A1* | 3/2013 | Tal | G06F 9/526 710/200 |
| 2014/0189693 A1 | 7/2014 | Trumbull et al. | |
| 2014/0282507 A1* | 9/2014 | Plondke | G06F 9/45545 718/1 |
| 2016/0357600 A1* | 12/2016 | Chimene | G06F 9/4818 |

OTHER PUBLICATIONS

Bruno, "What Is Priority Inversion (And How Do You Control It)?", http://www.drdobbs.com/jvm/what-is-priority-inversion-and-how-do-yo/230600008, Jun. 13, 2011, 4 pages.

* cited by examiner

*Primary Examiner* — Diem K Cao

(57) ABSTRACT

The threads of a user mode process can access various different resources of a computing device, and such access can be serialized. To access a serialized resource, a thread acquires a lock for the resource. For each context switch in the computing device, a module of the operating system kernel checks for priority inversions, which is a situation in which a higher priority thread of the user mode process is waiting for (blocking on) a resource for which a lower priority thread has acquired a lock. In response to detecting such a priority inversion, the priority of the lower priority thread is boosted to allow the priority thread to execute and eventually release the lock that the higher priority thread is waiting for.

20 Claims, 5 Drawing Sheets

BOOSTING USER THREAD PRIORITIES TO RESOLVE PRIORITY INVERSIONS

BACKGROUND

Programs are run on a computing device as one or more processes, each of which can be made up of one or more threads that execute on the processor(s) of the computing device. The threads can run at different priority levels, with higher priority threads typically being executed prior to and/or more frequently than lower priority threads. However, situations can arise in which two different threads running on a computing device attempt to access the same resource but only one of the threads can access the resource at any given time. This can lead to priority inversion, where a higher priority thread is waiting to execute because it needs to access a resource held by a lower priority thread. This priority inversion can be problematic because it is contrary to the reasons for having thread priorities (allowing higher priority threads to be executed prior to and/or more frequently than lower priority threads).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in response to determining to switch contexts in a computing device, lock data is retrieved from a lock buffer of a user mode thread being switched out. This lock data includes an indication of one or more resources that the user mode thread has locked. The lock data is added to a lock record that is associated with a process that includes the user mode thread. Based on the lock record and the lock data, whether a priority of the user mode thread is to be increased is determined, and the priority of the user mode thread is increased in response to determining that the priority of the user mode thread is to be increased.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
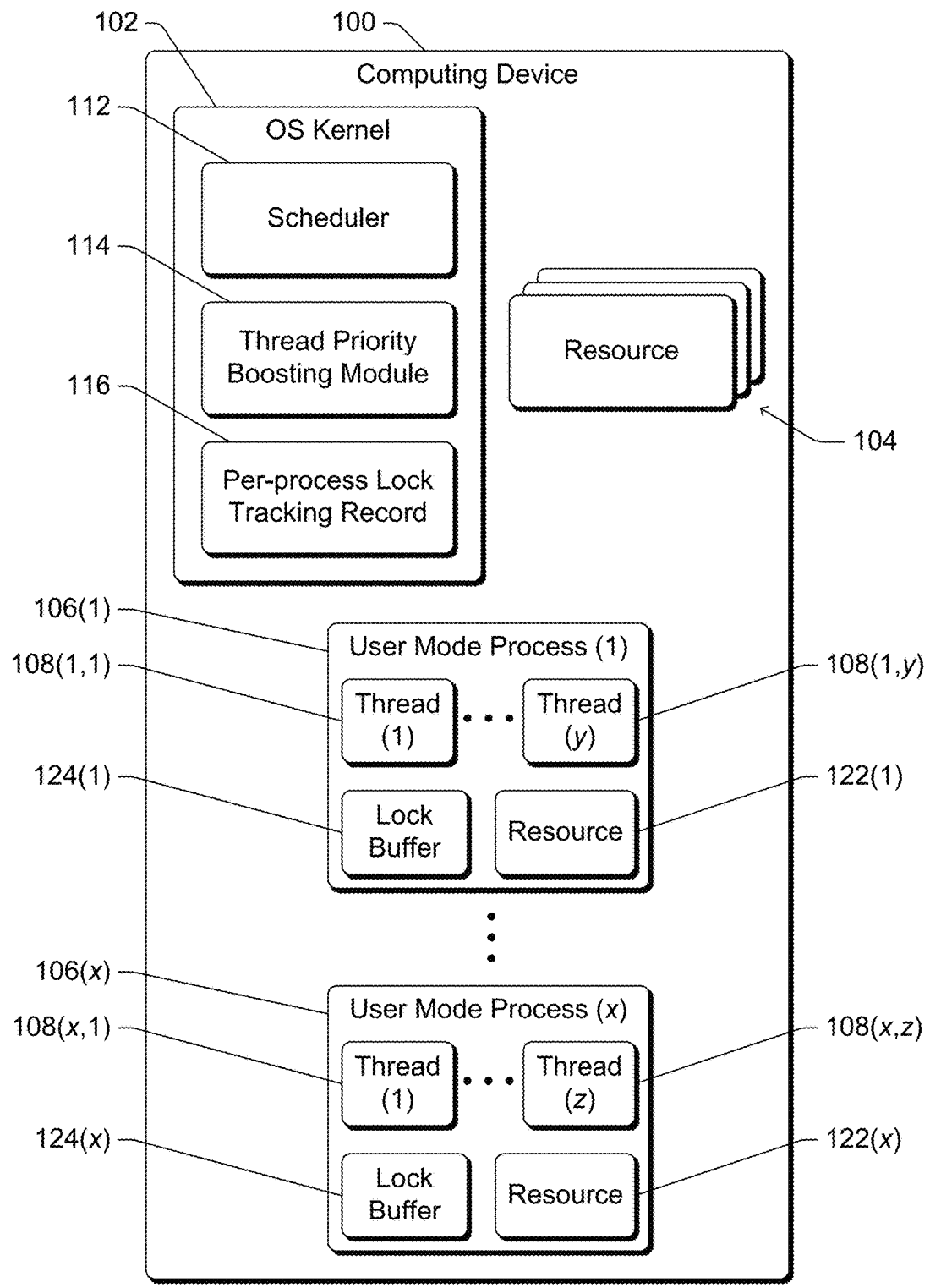
FIG. 1 is a block diagram illustrating an example computing device implementing the boosting user mode thread priorities to resolve priority inversions in accordance with one or more embodiments.

Boosting user mode thread priorities to resolve priority inversions is discussed herein. Programs can be executed as a process in user mode on a computing device, and each process can include one or more threads. Each thread can be scheduled for execution on a processor or processor core at different times. Each thread has an associated priority. This associated priority can be a processor priority indicating which of multiple different threads of the process has priority to be executed on a processor or processor core at any given time. Additionally or alternatively, this associated priority can be other priorities, such as an input/output (I/O) priority indicating which of multiple different threads of the process has priority to perform input and/or output via a data transfer component or device at any given time, network access priorities, and so forth.

The threads of a user mode process can access various different resources of the computing device, such as memory locations, I/O devices or components, and so forth. In some situations, access to a resource is serialized, which refers to only one thread being able to access the resource at any given time. A thread acquires access to a resource, which is also referred to as having or holding a lock for the resource. Having a lock for the resource prevents any other thread of the process from accessing the resource until the thread that has the lock releases the resource, which is also referred to as releasing the locking.

Situations can arise with serialized access to resources in which a lower priority thread has a lock on the resource and a higher priority thread desires to access the resource. The higher priority thread is blocked from running until the lower priority thread releases the resource, resulting in a situation in which the higher priority thread is blocked or waiting on a lower priority thread. This situation is referred to as a priority inversion, and the techniques discussed herein identify the existence of such priority inversions and resolve the priority inversions efficiently without significantly slowing down the performance of the actual workload of the process. A priority inversion is resolved by boosting or increasing the priority of the lower priority thread at least temporarily. This boosting of the lower priority thread allows the lower priority thread to execute (or its disk I/O to complete, or its network I/O to complete, etc.) so that the lower priority thread can finish its access to the resource and release the lock. The priority of the boosted lower priority thread can then be decreased back to its priority prior to being boosted, allowing the higher priority thread to execute and access the resource. The techniques discussed herein can be used in situations in which threads are serialized for any reason, including serialized access to resources.

Each thread of a user mode process has a buffer, referred to as a lock buffer, in which the thread stores the identifiers of serialized resources that the thread has acquired access to (e.g., locked). The thread adds the identifier of the resource (e.g., a memory address of the resource) to the lock buffer when the thread acquires the lock to the resource, and removes the identifier of the resource from the lock buffer when the thread releases the lock.

An operating system kernel on the device manages context switches, which is the switching of which thread is run on a processor or processor core. The operating system kernel maintains a data structure that is a record, for each processor, of the locks that are being held by each thread of the process and the locks that any threads of the process are waiting for (waiting to be released). At context switch time, the operating system kernel adds the information from the lock buffer of the thread being switched out to the data structure, and checks for any priority inversions for the process. In response to identifying a priority inversion for the process, the operating system kernel boosts the priority of the lower priority thread that holds the lock that results in the priority inversion.

The techniques discussed herein provide for improved operation of the computing device by identifying and resolving priority inversions in user mode processes. By using the lock buffers in the threads, resource locks can be acquired and released by a thread while the thread is executing without updating the data structure maintained by the operating system kernel. This allows switches between execution of threads in a user-mode context and kernel-mode context to be avoided until the time of a context switch for the user mode process, avoiding expending the time and energy to switch to the kernel-mode context to update the data structure maintained by the operating system kernel for every resource lock acquisition.

FIG. 1 is a block diagram illustrating an example computing device 100 implementing the boosting user mode thread priorities to resolve priority inversions in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 100 may range from a full-resource device with substantial memory and processor resources (e.g., personal computers, game consoles) to a low-resource device with limited memory and/or processing resources (e.g., traditional set-top boxes, hand-held game consoles).

Computing device 100 includes an operating system kernel 102, one or more resources 104, and multiple (x) user mode processes 106(1), . . . , 106(x). Each process 106 includes one or more threads. As shown in FIG. 1, user mode process 106(1) includes y threads 108(1,1), . . . , 108(1,y), and user mode process 106(x) includes z threads 108 (x,1), . . . , 108(x,z).

The operating system (OS) kernel 102 includes a scheduler 112, a thread priority boosting module 114, and a per-process lock tracking record 116. The scheduler 112 manages scheduling of threads 108 of user mode processes 106 for execution on one or more processors and/or processor cores of the computing device 100. The scheduler 112 can apply any of a variety of different public and/or proprietary scheduling techniques to determine which thread 108 to schedule for execution on which processor and/or processor core at which time. In one or more embodiments, these scheduling techniques including taking into account the priorities of the threads 108. Different threads 108 can have different priorities that are assigned by the operating system kernel 102 and/or other entities. For example, threads 108 can be assigned a priority value of 1 through 10, with 1 being the lowest priority and 10 being the highest priority.

In one or more embodiments, the boosting of thread priorities discussed herein refers to boosting the priority of threads for execution by a processor or processor core, also referred to as the processor priority. The processor priority is used by the scheduler 112 to determine which threads are scheduled for execution when. Additionally or alternatively, the boosting of thread priorities discussed herein can refer to boosting of other thread priorities, such as boosting the priority of threads for access to I/O components or devices (e.g., a storage device, a network interface card, etc.), also referred to as the I/O priority, boosting the priority of threads for network access, and so forth.

The techniques discussed herein can be used in any situation in which threads are serialized. Whenever threads serialize one after the other, their priorities start to matter and hence the techniques discussed herein can be used to boost thread priorities if one thread is preventing another thread with higher priority from running.

The threads of a user mode process can access various different resources of the computing device, such as memory locations, I/O devices or components, and so forth. These resources can be resources accessible to multiple processes, shown as resources 104. These resources can also be resources specific to the individual processes, shown as resource 122(1) specific to user mode process 106(1) and resource 122(x) specific to user mode process 106(x). Although a single resource 122 is illustrated as being specific to each user mode process 106, it should be noted that there can be any number of resources specific to a user mode process 106.

Access to various different ones of the resources 104 and/or 122 can be serialized, which refers to only one thread being able to access the resource at any given time. A resource to which access is serialized can also be referred to as a serialized resource. Which resources 104 and/or 122 are serialized can be specified in different manners, such as by the code of the user mode process 106 that includes the resource, by the OS kernel 102, and so forth. During operation, when a thread 108 requests access to a serialized resource, a check is made as to whether another thread is already accessing the resource. This check can be made, for example, by code of the user mode process 106 that includes the serialized resource, and can be inherent in the request to access the serialized resource. For example, a serialized write command to a memory location can be made, and the serialized write command is successful (indicating that no other thread is using a resource associated with the memory location) only if a particular value is (or is not) stored in that memory location.

If another thread is not currently accessing the resource (e.g., the lock for the resource is not being held by another thread), then the thread 108 acquires the lock to the resource and obtains access to the resource. The thread 108 accesses the resource as desired, then releases the lock for the resource thereby allowing other threads of the process to access the resource. However, if another thread is currently accessing the resource (e.g., the lock for the resource is being held by another thread), then the thread 108 waits for the lock to the resource to be released. The thread 108 waiting for the lock to the resource to be released is also referred to as blocking on the resource.

Each user mode process 106 includes a lock buffer 124. When a thread 108 of a process 106 acquires a lock for a resource, the thread 108 stores an identifier of the resource in the lock buffer 124 of the same process 106 as includes the thread 108. For example, when a thread 108(1,1) acquires a lock for a resource, the thread 108(1,1) stores an identifier of the resource in the lock buffer 124(1). The identifier of the resource can take various forms, such as a memory address, globally unique identifier (GUID) of a device or component, and so forth. When the thread releases the lock for a resource, the thread 108 deletes or otherwise removes the identifier of the resource form the lock buffer 124.

When a thread 108 of a process 106 is blocking on a resource, a record is maintained of the resource that the thread 108 is blocking on. This record can include, for example, an identifier of the resource (e.g., the same identifier as would be stored in the lock buffer 124 if the thread 108 acquired a lock for the resource). This record can be maintained in different locations, and in one or more embodiments is stored in the lock buffer 124.

Figures 2, 3:
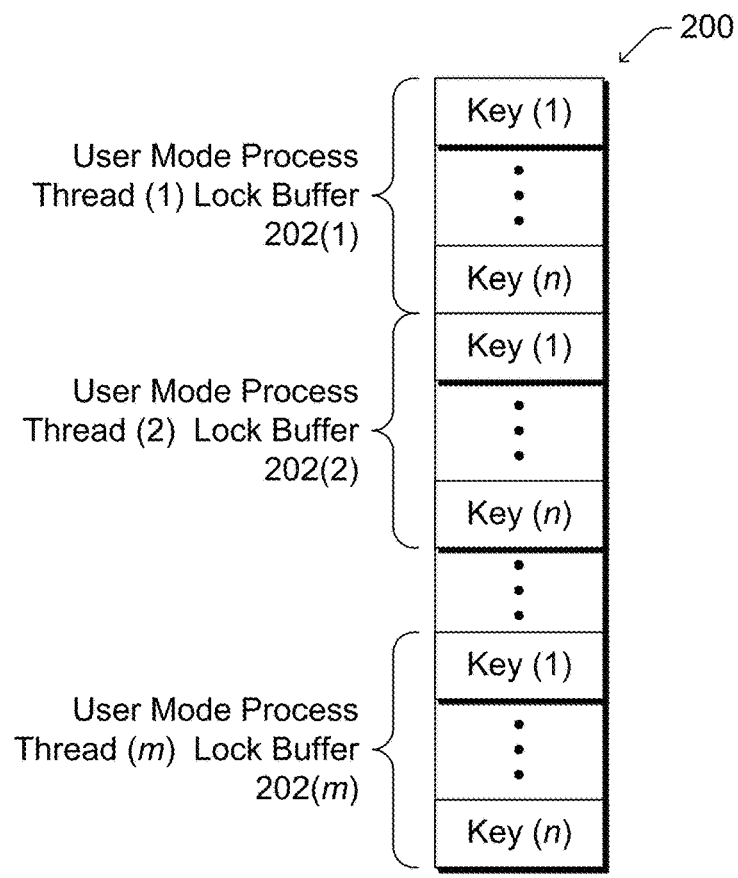
FIG. 2 illustrates an example collection of lock buffers in accordance with one or more embodiments.
FIG. 3 illustrates an example per-process lock tracking record in accordance with one or more embodiments.

FIG. 2 illustrates an example collection 200 of lock buffers in accordance with one or more embodiments. The collection 200 of lock buffers is a set of lock buffers 202(1), . . . , 202(m), each associated with a different thread in the same process. Each of the lock buffers 202 can be a lock buffer 124 of FIG. 1. A lock buffer 202(1) includes one or more (up to n) keys for one user mode thread of the process, a lock buffer 202(2) includes one or more (up to n) keys for another user mode thread of the process, and so forth. In one or more embodiments, each key in the lock buffer is an identifier of a resource for which the thread associated with that lock buffer has acquired a lock. Additional information can optionally be included as part of the key, such as an identifier of the thread.

In one or more embodiments, in situations in which a record of a resource that a thread is blocking on is included in the lock buffer 202 associated with the thread, a key in the lock buffer 202 includes an indication that the thread is blocking on the resource identified by the key. Alternatively, a particular entry in the lock buffer (e.g., the last key in the lock buffer) can be reserved and used to identify a resource that a thread is blocking on.

In one or more embodiments, a portion of memory (e.g., a memory page, such as a 4 kilobyte memory page) allocated to a process is used for the collection 200 of lock buffers. Each buffer 202 is part of that portion of memory. Additionally, although the lock buffers are illustrated in FIG. 2 as each being the same size (e.g., including up to n keys), alternatively the lock buffers for different threads of the same process can have different sizes. The size of each buffer 202 can optionally be dynamic and change (e.g., grow or shrink) over time (e.g., as more threads run in the user mode process). Similarly, the portion of memory allocated to a process that is used for the collection 200 of lock buffers can optionally be dynamic and change (e.g., grow or shrink) over time (e.g., as more threads run in the user mode process).

In one or more embodiments, the collection 200 is a portion of memory that is locked in physical memory of the computing device 102. This portion of memory is locked in physical memory and cannot be paged out, and thus is available to the scheduler 112. For example, in some situations the scheduler 112 and components working with the scheduler 112 (e.g., the thread priority boosting module 114) are not able to take a page fault and thus all information needed by these components is stored in non-pageable (locked) memory of the computing device 102 to ensure the information will be available to these components when needed.

It should be noted, however, that the lock buffers 202 can optionally be dynamically locked and unlocked as processes are suspended/resumed. For example, if a process is suspended and none of its threads are schedulable then the user mode lock buffer does not need to be locked into physical memory, allowing the system to save physical memory usage.

Returning to FIG. 1, threads 108 of a process 106 can acquire and release locks on resources as they run, adding identifiers of the resource to the lock buffer 124 when the locks are acquired and removing the identifiers from the lock buffer 124 when the locks are released. Context switches can occur in the computing device 100, a context switch referring to a switch for a processor or processor core from executing one thread to executing another thread.

At the time of a context switch, the thread priority boosting module 114 retrieves the lock buffer from the thread being switched out (e.g., the thread that will stop, at least temporarily, executing on the processor or processor core). The thread priority boosting module 114 updates the per-process lock tracking record 116 to reflect changes since the thread was last switched out. These changes can include adding indications of any new locks that the thread being switched out has acquired, deleting or otherwise removing indications of any locks that the thread being switch out has released, adding indications of any locks that the thread being switched out is waiting on, and/or deleting or otherwise removing indications of any locks that the thread being switch out is no longer waiting on.

FIG. 3 illustrates an example per-process lock tracking record 300 in accordance with one or more embodiments. The per-process lock tracking record 300 can be, for example, a per-process lock tracking record 116 of FIG. 1. The per-process lock tracking record 300 includes multiple (p) entries 302(1), . . . , 302(p). Each entry 302 includes a key, a thread identifier, and an owner/waiter indicator.

The key of an entry includes an identifier of a resource that a thread has locked or is blocking on. In one or more embodiments, a single per-process lock tracking record 300 is used for multiple user mode processes 106. In such embodiments, the key also includes an identifier of the thread that has locked or is blocking on the resource. The identifier of the thread and the identifier of the resource can be combined in various manners to generate the key of an entry, such as concatenating the identifier of the thread and the identifier of the resource, generating a hash value based on the identifier of the thread and the identifier of the resource, and so forth.

Additionally or alternatively, a per-process lock tracking record 300 is used for a single user mode process 106. In such situations, the key of an entry in the per-process lock tracking record 300 includes an identifier of the resource that a thread has locked or is blocking, but need not (and typically does not) include an identifier of the thread that has locked or is blocking on the resource.

Each entry 302 also includes a thread identifier and an owner/waiter indicator. The thread identifier is an identifier of the thread that acquired the lock to the resource (also referred to as the owner of the lock for the resource) identified by the key in the entry 302 or an identifier of the thread that is blocking on the resource identified by the key in the entry 302. The owner/waiter indicator indicates whether the thread identified by the thread identifier is an owner of the lock for the resource or is a waiter for (is blocking on) the resource. These entries 302 allow a data structure to be built (or can be used as a data structure) that tracks for a given lock identifier, which threads are the owners and which ones are the waiters so appropriate boosting can take place.

It should be noted that there can be multiple waiters on the same lock. Each thread will have its own entry 302 in the record 300 when the thread is waiting on a lock. Similarly, there can be multiple owners of a lock (with a single or multiple waiters). Each thread will have its own entry 302 in the record 300 when the thread is the owner of a lock.

The record 300, although shown as a table, can be any of a variety of different data structures. For example, the record 300 can be implemented as a tree structure.

The thread priority boosting module 114 retrieves the lock buffer 124 for the thread being switched out and updates the per-process lock tracking record 116 to reflect changes since the thread was last switched out. The thread priority boosting module 114 can detect that a new lock for a resource (since the thread was last switched out) has been obtained by the thread. A new lock can be detected by, for example, identifying in the lock buffer associated with the thread an acquired lock for a resource for which there is no entry 302 in the per-process lock tracking record 116. In response to detecting a new lock for a resource since the thread was last switched out has been obtained by the thread, the thread priority boosting module 114 adds a new entry to the per-process lock tracking record 116 that includes the identifier of the resource and an identifier of the thread being switched out as the lock owner for the new lock.

The thread priority boosting module 114 can detect that a lock for a resource (since the thread was last switched out) has been released by the thread. A released lock can be detected by, for example, identifying in per-process lock tracking record 116 an entry 302 that identifies the thread and a resource for which there is no acquired lock identified in the lock buffer associated with the thread. In response to detecting a released lock for a resource since the thread was last switched out, the thread is unboosted (returned to the priority it had prior to being boosted) if the thread was boosted previously for that lock. Additionally, the thread priority boosting module 114 deletes the entry 302 from the per-process lock tracking record 116 that identifies the resource and the thread that released the lock.

It should be noted that boosts can be removed (e.g., a thread unboosted) in various different manners. For example, boots can be removed lazily and/or inline, or based on some other heuristic. In the lazy case, the boost could be removed, for example, during the owner thread's next context switch after lazily detecting that it has released some lock(s). For the inline case, the boost can be initiated via a call from user-mode explicitly when the user-mode thread updates its user-mode lock tracking structure that indicates that the thread was boosted (the thread priority boosting module 114 would update the thread's user-mode structures during boosting).

The thread priority boosting module 114 can detect that the thread being switched out is blocking on a resource. The thread blocking on a resource can be detected by, for example, identifying in the lock buffer associated with the thread or another record associated with the thread an identifier of a resource on which the thread is blocking. In response to detecting that the thread is blocking on a resource, the thread priority boosting module 114 adds a new entry in the per-process lock tracking record 116 that includes the identifier of the resource and an identifier of the thread being switched out as the lock waiter for the resource.

The thread priority boosting module 114 can detect that the thread being switched out is no longer blocking on a resource. The thread no longer blocking on a resource can be detected by, for example, identifying in the lock buffer associated with the thread or another record associated with the thread the absence of an identifier of a resource on which the thread is blocking. In response to detecting that the thread is no longer blocking on a resource, the thread priority boosting module 114 deletes the entry in the per-process lock tracking record 116 that identifies the resource and the thread as blocking on the resource.

At the time of a context switch, after updating the per-process lock tracking record 116 to reflect changes since the thread was last switched out, the thread priority boosting module 114 determines whether any priority inversions exist with respect to threads of the user mode process. The priority inversions occur within a process—priority inversions as discussed herein are not present across different processes. A priority inversion refers to a situation in which one thread is preventing another thread with higher priority from running, such as when a higher priority thread is waiting for (blocking on) a resource for which a lower priority thread has acquired a lock.

Priority inversions can be readily detected by the thread priority boosting module 114 by analyzing the per-process lock tracking record 116. For each entry 302 in the per-process lock tracking record 116 that identifies a thread as waiting on a resource, the thread priority boosting module 114 checks the priorities of the lock owner and the lock waiter. If the priority of the lock owner is lower than the priority of the lock waiter for the same resource, the per-process lock tracking record 116 detects the presence of priority inversion.

In response to detecting the presence of a priority inversion, the thread priority boosting module 114 boosts the priority of the thread that is the owner of the lock. This boosting can be performed in various manners, such as the thread priority boosting module 114 invoking a function or method of the operating system kernel 102 to increase the priority of the thread, the thread priority boosting module 114 communicating a notification to the scheduler 112 to increase the priority of the thread, and so forth.

In one or more embodiments, the priority of the thread is boosted to be the same as the priority of the thread that is blocking on the resource. Alternatively, the priority of the thread can be boosted to other priorities.

Additionally, in one or more embodiments, when boosting some types of priority, the boosting is done in multiple parts. For example, when boosting I/O priority, the boosting is done in two parts. The first part is boosting outstanding I/O's to so that the stack (e.g., storage stack, network stack, etc.) completes them according to the new (higher) priority. The second part is boosting the I/O priority of the thread so that its future I/O's are issued at the new (higher) priority.

It should be noted that, as discussed above, there can be multiple waiters on the same lock. In such situations, the lock owner is boosted to be the highest priority (or at least the highest priority) of all of the waiters on the lock. Similarly, there can be multiple owners of a lock. In such situations, all lock owners are boosted to be the highest priority (or at least the highest priority) of all of the waiters on the lock.

Eventually, after the priority of the thread that owns the lock is boosted, the thread that owns the lock will execute. This can include situations in which the priority of the thread being switched out is boosted and the context switch is halted so that the thread is no longer switched out. The thread that owns the lock executes and eventually releases the lock.

After releasing the lock (e.g., at the time of the next context switch), the priority of the boosted thread is lowered. In one or more embodiments, the priority of the boosted thread is returned to the same priority as the thread had prior to being boosted. The priority of the boosted thread can be lowered in various manners, such as the thread priority boosting module 114 invoking a function or method of the operating system kernel 102 to decrease the priority of the thread, the thread priority boosting module 114 communicating a notification to the scheduler 112 to decrease the priority of the thread, and so forth.

Figure 4:
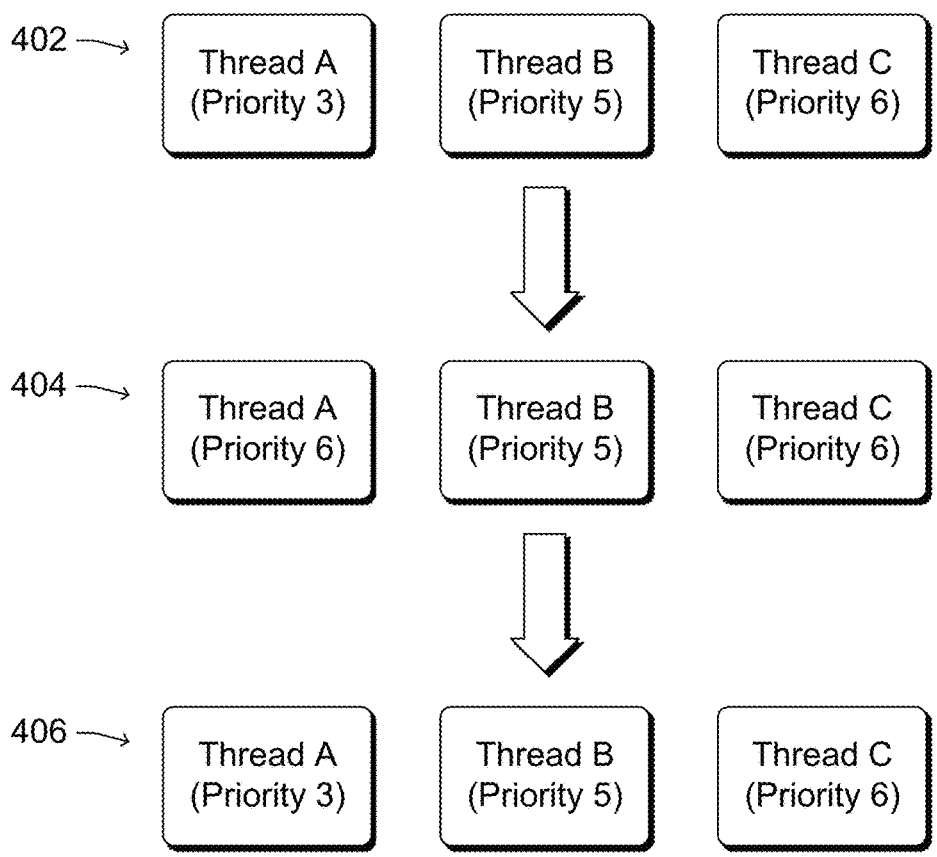
FIG. 4 illustrates an example of boosting a user mode thread in accordance with one or more embodiments.

FIG. 4 illustrates an example 400 of boosting a user mode thread in accordance with one or more embodiments. In the example 400, a process includes three threads: thread A, thread B, and thread C. Initially, at 402, thread A has a priority of 3, thread B has a priority of 5, and thread C has a priority of 6. In this example lower values indicate lower priorities, so thread A is the lowest priority of the three threads and thread C is the highest priority of the three threads.

Assume that thread A eventually executes for an amount of time and acquires a lock on a resource D. Thread C then executes and attempts to access resource D. Thread A is the owner of the lock on resource D, so thread C is blocking on resource D. This is a priority inversion because thread C is being blocked by a lower priority thread.

To resolve the priority inversion, the priority of thread A is boosted to be the same as the priority of thread C, shown at 404. Thread A is now higher priority than thread B, and will be executed (typically prior to or more frequently than thread B as a result of the higher priority) so as to release the lock on resource D. By boosting the priority of thread A to be the same as thread C, thread B (which is a lower priority than thread C) is not scheduled to run and starve off thread A, and thus starve off thread C as well.

After thread A has released the lock on the resource, the priority of thread A is lowered to be the same as it was prior to being boosted, shown at 406. At 406, thread C is no longer blocking on the resource and will be scheduled to run (typically prior to or more frequently than thread B as a result of the higher priority).

Figure 5:
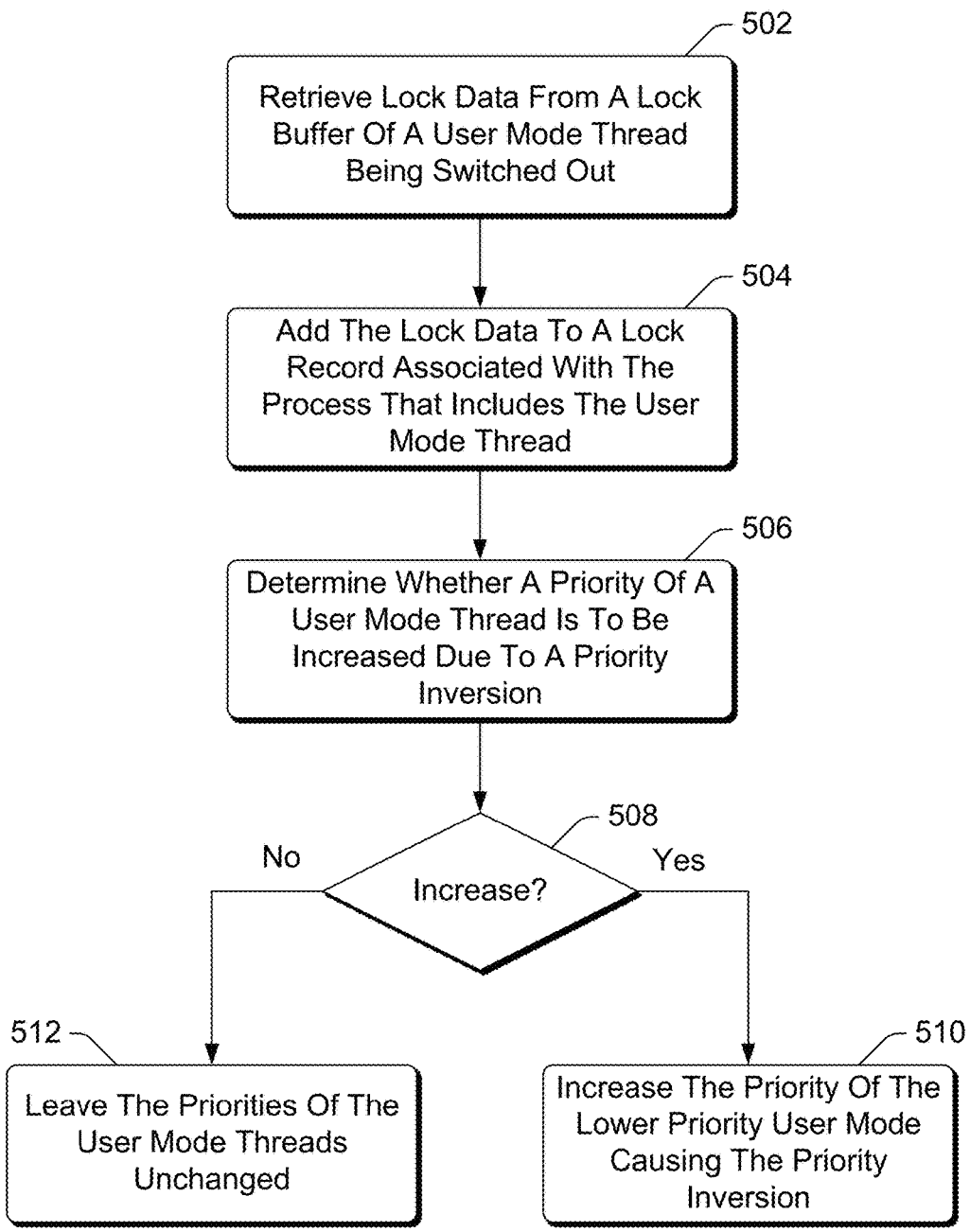
FIG. 5 is a flowchart illustrating an example process for implementing the boosting user mode thread priorities to resolve priority inversions in accordance with one or more embodiments.

FIG. 5 is a flowchart illustrating an example process 500 for implementing the boosting user mode thread priorities to resolve priority inversions in accordance with one or more embodiments. Process 500 is carried out by a thread priority boosting module, such as thread priority boosting module 114 of FIG. 1, and can be implemented in software, firmware, hardware, or combinations thereof. Process 500 is shown as a set of acts and is not limited to the order shown for performing the operations of the various acts. Process 500 is an example process for implementing the boosting user mode thread priorities to resolve priority inversions; additional discussions of implementing the boosting user mode thread priorities to resolve priority inversions are included herein with reference to different figures.

In process 500, lock data is retrieved from a lock buffer of a user mode thread begin switched out at the time of a context switch (act 502). The lock data includes identifiers of resources for which the thread being switched out has acquired a lock and/or an identifier of a resource that the thread being switched out is blocking on.

The lock data is added to a lock record associated with the process the includes the user mode thread (act 504). This lock record can be a per-process lock tracking record 116 as discussed above.

A determination is then made as to whether a priority of a user mode thread is to be increased due to a priority inversion (act 506). A priority inversion occurs when one thread is preventing another thread with higher priority from running, such as when a higher priority thread is blocking on a resource for which a lock has been acquired by a lower priority thread.

Process 500 proceeds based on whether the priority of a thread is to be increased (act 508). If the priority of a thread is to be increased (e.g., there is a priority inversion), then the priority of the thread is increased (act 510). However, if the priority of a thread is not to be increased (e.g., there is no priority inversion), then the priorities of the user mode threads remain unchanged (act 512).

It should be noted that the techniques discussed herein provide resilience against malicious code. Malicious code may attempt to use the lock buffer to incorrectly identify resources for which locks have been acquired. However, the lock buffer is just a record of the identifiers of the resources—the operating system kernel 102 just uses these identifiers to detect priority inversions. The operating system kernel does not allow access to the identified resources based on just the presence of the identifiers of the resources in the lock buffer, and thus any malicious code would only be able to adjust the priorities of threads in the same process as the malicious code and would not be able to maliciously access the resources for which locks are maliciously (or supposedly) obtained. Furthermore, malicious code cannot boost its priority higher than that the process is normally allowed because the lock records are per-process and not global.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
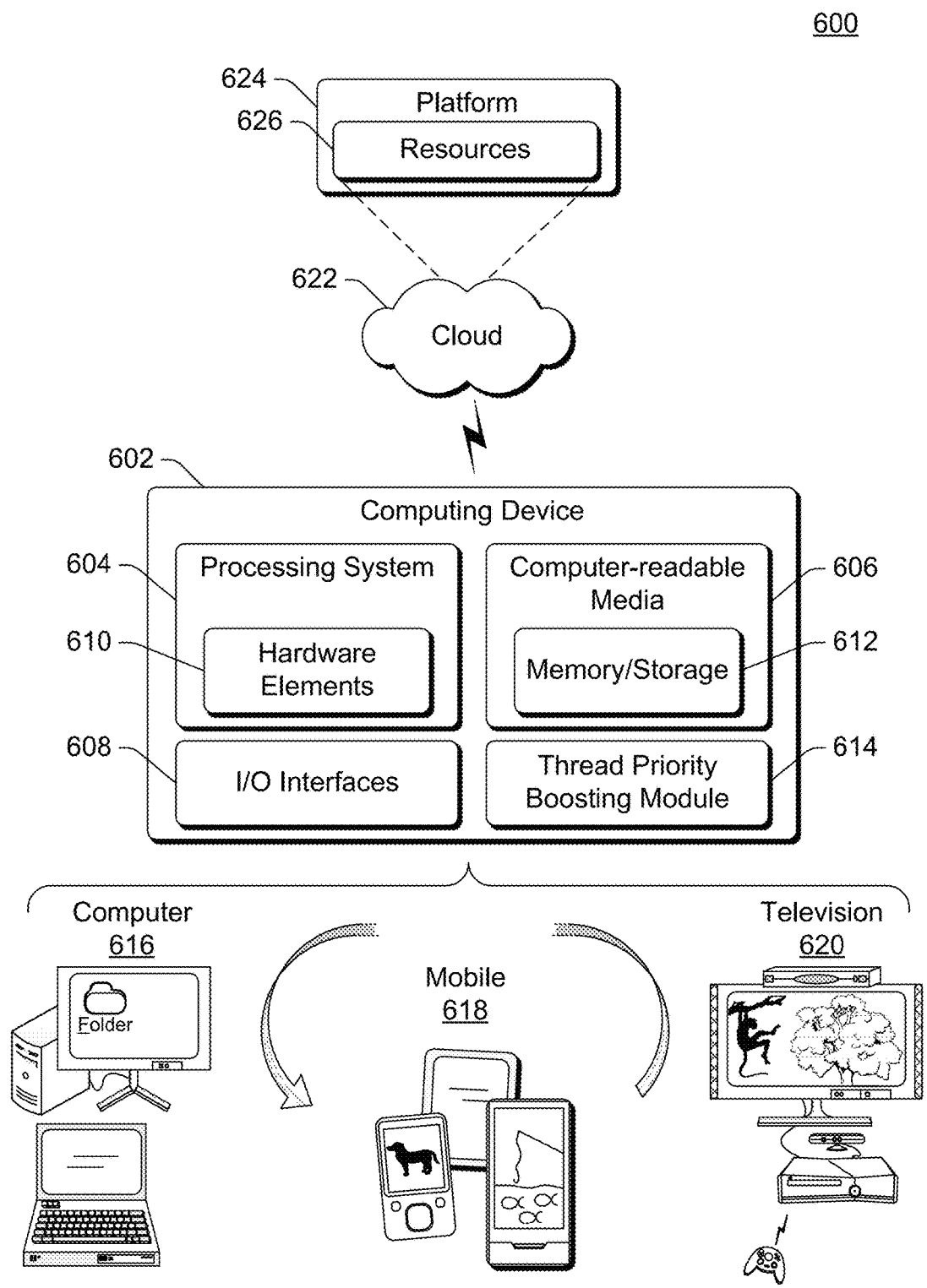
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware.

Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a thread priority boosting module 614. The thread priority boosting module 614 provides various functionality to maintain a per-process lock tracking record and boost user mode thread priorities as discussed above. The thread priority boosting module 614 can implement, for example, the thread priority boosting module 114 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: in response to determining to switch contexts in the computing device, retrieving lock data from a lock buffer of a user mode thread being switched out, the lock data including an indication of one or more resources that the user mode thread has locked; adding the lock data to a lock record that is associated with a process that includes the user mode thread; determining, based on the lock record and the lock data, whether a priority of the user mode thread is to be increased; and increasing the priority of the user mode thread in response to determining that the priority of the user mode thread is to be increased.

Alternatively or in addition to any of the above described methods, any one or combination of: the lock data further including an indication of one or more resources that the user mode thread being switched out is blocked on; the indication being an indication of one or more resources that remain locked by the user mode thread at the time of switching contexts; the lock record comprising a lock record that maintains lock data for the process but not other processes running on the computing device; the lock record comprising a lock record that maintains lock data for multiple processes running on the computing device, the lock data being keyed based on an identifier of both the resource and the process; the determining comprising determining that the priority of the user mode thread is to be increased in response to determining, based on the lock record and the lock data, that the user mode thread has locked a resource that a higher priority user mode thread of the process is waiting on; the updating the priority of the user mode thread comprising increasing the priority of the user mode thread to be a same priority as the higher priority user mode thread waiting on the resource that has been locked by the user mode thread; the priority of the user mode thread comprising a processor priority of the user mode thread; the priority of the user mode thread comprising an I/O priority of the user mode thread; the method further comprising returning, in response to the resource being released by the user mode thread, the user mode thread to a same priority as the user mode thread had prior to being updated; the returning the user mode thread to the same priority as the user mode thread had prior to being updated comprising lowering the priority of the user mode lazily and/or at the time the lock is released.

A computing device comprising: one or more processors; and a computer-readable storage media having stored thereon multiple instructions that, when executed by the one or more processors, cause the one or more processors to:

retrieve, in response to a context switch in the computing device, lock data from a lock buffer of a user mode thread being switched out, the lock data including an indication of one or more resources that the user mode thread has locked; add the lock data to a lock record that is associated with a process that includes the user mode thread; determine, based on the lock record, whether a priority of the user mode thread is to be increased; and increase the priority of the user mode thread in response to determining that the priority of the user mode thread is to be increased.

Alternatively or in addition to any of the above described computing devices, any one or combination of: the indication being an indication of one or more resources that remain locked by the user mode thread at the time of the context switch; wherein to determine whether the priority of the user mode thread is to be increased is to determine that the priority of the user mode thread is to be increased in response to determining, based on the lock record, that the user mode thread has locked a resource that a higher priority user mode thread of the process is blocking on; wherein to increase the priority of the user mode thread is to increase the priority of the user mode thread to be a same priority as the higher priority user mode thread blocking on the resource that has been locked by the user mode thread; wherein the multiple instructions further cause the one or more processors to return, in response to the resource being released by the user mode thread, the user mode thread to a same priority as the user mode thread had prior to being updated.

A method implemented in a computing device, the method comprising: retrieving lock data from a lock buffer of a user mode thread being switched out during a context switch in the computing device, the lock data including an indication of one or more resources that the user mode thread has locked; adding the lock data to a lock record that is associated with a process that includes the user mode thread; determining, based on the lock record, whether a priority inversion exists for the process; and increasing the priority of a lower priority user mode thread in response to determining that a priority inversion exists for the process.

Alternatively or in addition to any of the above described methods, any one or combination of: the indication being an indication of one or more resources that remain locked by the user mode thread at the time of the context switch; the lock record comprising a lock record that maintains lock data for the process but not other processes running on the computing device; the lock record comprising a lock record that maintains lock data for multiple processes running on the computing device, the lock data being keyed based on an identifier of both the resource and the process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    in response to determining to switch contexts in the computing device, retrieving lock data from a lock buffer of a user-mode thread being switched out, the lock data including an identifier identifying one or more resources that the user-mode thread has locked;
    adding the retrieved lock data to a lock record that is associated with a process that includes the user-mode thread;
    determining, based on the lock record and the lock data, whether the user-mode thread is in a priority inversion; and
    increasing a priority of the user-mode thread in response to determining that the user-mode thread is in a priority inversion.

2. The method as recited in claim 1, the lock data further including an indication that the user-mode thread being switched out is blocked on the resource identified by the identifier.

3. The method as recited in claim 1, wherein the resource remains locked by the user-mode thread at at time of switching contexts.

4. The method as recited in claim 1, the lock record comprising a lock record that maintains lock data for only the process and contains no lock data for any other processes running on the computing device.

5. The method as recited in claim 1, further comprising maintaining additional lock data for multiple processes running on the computing device, the lock data and the additional lock data being keyed based on an identifier of both the resource and the process.

6. The method as recited in claim 1, wherein the determining that the user-mode thread is in a priority inversion is based on another resource identifier in the lock record and is based on the identifier in the lock data added to the lock record.

7. The method as recited in claim 6, the increasing the priority of the user-mode thread comprising setting the priority of the user-mode thread to be a same priority as another user-mode thread that has been determined, according to the lock record, to be waiting on the resource that has been locked by the user-mode thread.

8. The method as recited in claim 1, the priority of the user-mode thread comprising a processor priority of the user-mode thread.

9. The method as recited in claim 1, the priority of the user-mode thread comprising an I/O priority of the user-mode thread.

10. The method as recited in claim 1, further comprising returning, based on the resource having been released by the user-mode thread, the user-mode thread to a same priority that the user-mode thread had prior to the increasing of its priority.

11. The method as recited in claim 10, the returning the user-mode thread to the same priority that the user-mode thread had prior to being updated comprising lowering the priority of the user-mode at the time the lock record is released.

12. A computing device comprising:
    one or more processors; and
    a computer-readable storage media having stored thereon multiple instructions that, when executed by the one or more processors, cause the one or more processors to:
        retrieve, in response to a context switch in the computing device, lock data from a lock buffer of a user-mode thread being switched out, the lock data including an identifier of one or more resources that the user-mode thread has locked;
        add the lock data, including the identifier, to a lock record that is associated with a process that includes the user-mode thread;

determine, based on the identifier in the lock record, whether there is a priority inversion involving the user-mode thread; and based on the determining step determining that there is a priority inversion involving the user-mode thread, increasing a priority of the user-mode thread.

13. The computing device as recited in claim 12, the identifier being an identifier of one or more resources that remain locked by the user-mode thread at the time of the context switch.

14. The computing device as recited in claim 12, wherein to determine whether the priority of the user-mode thread is to be increased comprises determining that the priority of the user-mode thread is to be increased in response to determining, based on the lock record, that the user-mode thread has locked a resource that a higher priority user-mode thread of the process is blocking on.

15. The computing device as recited in claim 14, wherein increasing the priority of the user-mode thread comprises increasing the priority of the user-mode thread to be a same priority as the higher priority user-mode thread blocking on the resource that has been locked by the user-mode thread.

16. The computing device as recited in claim 12, wherein the multiple instructions further cause the one or more processors to return, in response to the resource being released by the user-mode thread, the user-mode thread to a same priority that the user-mode thread had before the priority increase.

17. Computer-readable storage hardware storing instructions configured to cause a computing device to perform a process, the process comprising:

maintaining thread-lock buffers for respective threads of a process, the threads having respective priorities, the maintaining comprising, for each thread:

when requesting a lock on a resource, adding an identifier of the resource to its respective thread-lock buffer; and when releasing a lock on a resource, removing an identifier of the resource from its respective thread-lock buffer;

each time one of the threads is context-switched out of the processor:

maintaining a lock-tracking record corresponding to the thread being context-switched out by (i) determining that the lock-tracking record lacks an entry for a resource that is in the corresponding thread-lock, and (ii) based thereon, adding an identifier of the resource to the lock-tracking record; and determining whether any of the threads are in a priority inversion based on the identifiers of resources in the lock-tracking record, and when a thread is determined to be in a priority inversion, increasing the priority of the determined thread.

18. Computer-readable storage hardware according to claim 17, wherein the determining whether any of the threads are in a priority inversion comprises searching for, in the lock-tracking record, duplicate identifiers of locks.

19. Computer-readable storage hardware according to claim 17, wherein the determining whether any of the threads are in a priority inversion is performed responsive to scheduling the thread to be context-switched out and after the maintaining has been performed.

20. Computer-readable storage hardware according to claim 17, wherein the maintaining the lock-tracking record corresponding to the thread being context-switched out further comprises (i) determining that the lock-tracking record contains an entry for a resource that is not in the corresponding thread-lock, and (ii) based thereon, removing an identifier of the resource to the lock-tracking record.

\* \* \* \* \*